United States Patent
Schieler et al.

(10) Patent No.: US 11,743,320 B2
(45) Date of Patent: Aug. 29, 2023

(54) FILE STORAGE AND RETRIEVAL

(71) Applicant: DIGNITY HEALTH, San Francisco, CA (US)

(72) Inventors: Seana Schieler, Phoenix, AZ (US); Kimberley Havens, Phoenix, AZ (US); Shyam Sunder Mutyala, Glendale, AZ (US); Sunilkumar Narayan Kakade, Phoenix, AZ (US); Saurabh Bhutyani, Phoenix, AZ (US); Srinivasa Rao Ganti, Phoenix, AZ (US)

(73) Assignee: DIGNITY HEALTH, San Francisco, CA (US)

( * ) Notice: Subject to any disclaimer, the term of this patent is extended or adjusted under 35 U.S.C. 154(b) by 0 days.

(21) Appl. No.: 17/286,261

(22) PCT Filed: Oct. 8, 2019

(86) PCT No.: PCT/US2019/055236
§ 371 (c)(1),
(2) Date: Apr. 16, 2021

(87) PCT Pub. No.: WO2020/081295
PCT Pub. Date: Apr. 23, 2020

(65) Prior Publication Data
US 2021/0360053 A1    Nov. 18, 2021

Related U.S. Application Data

(60) Provisional application No. 62/748,169, filed on Oct. 19, 2018.

(51) Int. Cl.
*G06F 15/16* (2006.01)
*H04L 67/06* (2022.01)
*G06F 16/11* (2019.01)
*H04L 67/1097* (2022.01)
*H04L 67/561* (2022.01)

(52) U.S. Cl.
CPC ............ *H04L 67/06* (2013.01); *G06F 16/113* (2019.01); *H04L 67/1097* (2013.01); *H04L 67/561* (2022.05)

(58) Field of Classification Search
CPC . H04L 67/06; H04L 67/1097; H04L 67/2804; G06F 16/113
See application file for complete search history.

(56) References Cited

U.S. PATENT DOCUMENTS

| 7,190,284 B1 | 3/2007 | Dye et al. |
| 11,100,044 B2 * | 8/2021 | Shekhar ............... G06F 16/148 |
| 2002/0029228 A1 | 3/2002 | Rodriguez et al. |
| 2003/0005464 A1 | 1/2003 | Gropper et al. |
| 2008/0037880 A1 | 2/2008 | Lai |
| 2013/0198143 A1 * | 8/2013 | Matsumoto ......... G06F 16/9574 707/661 |
| 2016/0156953 A1 | 6/2016 | Phipps et al. |

OTHER PUBLICATIONS

International Search Report and Written Opinion for PCT/US19/55236, dated Jan. 10, 2020 (12 pages).

* cited by examiner

*Primary Examiner* — Yves Dalencourt
(74) *Attorney, Agent, or Firm* — Quarles & Brady LLP

(57) ABSTRACT

The present invention relates to a system and method configured to store and retrieve files and, specifically, to a system and method for encoding files, such as image files or video files, into compressed archive and then later retrieving the files from the compressed archive in response to user requests.

20 Claims, 5 Drawing Sheets

FIG. 5

FILE STORAGE AND RETRIEVAL

CROSS REFERENCES TO RELATED APPLICATIONS

This application represents the national stage filing of International Application No. PCT/US2019/055236, filed Oct. 8, 2019, which claims the benefit of U.S. Provisional Application No. 62/748,169, filed on Oct. 19, 2018 and titled "FILE STORAGE AND RETRIEVAL," the entirety of which is hereby incorporated by reference herein.

FIELD OF THE INVENTION

This disclosure relates to the field of systems and methods configured to store and retrieve files and, specifically, to systems and methods for encoding files, such as image files or video files, into compressed archives and then later retrieving the files from the compressed archives in response to user requests.

SUMMARY OF THE INVENTION

The present invention provides systems and methods comprising one or more server hardware computing devices or client hardware computing devices, communicatively coupled to a network, and each comprising at least one processor executing specific computer-executable instructions within a memory.

In an embodiment, a system includes an application server, including a database identifying, for each file identifier in a plurality of file identifiers, an associated file archive identifier.

The application server is configured to receive, from a user device, a request for a file, the request for a file including a first file identifier, access the database to identify a first file archive identifier associated with the first file identifier in the data, and transmit a file retrieval instruction including the first file identifier and the first file archive identifier. The system includes a cloud computing environment. The cloud environment includes a memory storing a plurality of file archives, each file archive in the plurality of file archives being associated with a file archive identifier, wherein each file archive includes a compressed file, and a processor, configured to receive, from the application server, the file retrieval instruction, decompress a portion of a first file archive in the plurality of file archives to retrieve a first file from the first file archive, wherein the first file archive is associated with the first file archive identifier, and transmit the first file to at least one of the application server and the user device.

The above features and advantages of the present invention will be better understood from the following detailed description taken in conjunction with the accompanying drawings.

BRIEF DESCRIPTION OF THE DRAWINGS

FIG. 5 depicts the contents of a sample archive index.

DETAILED DESCRIPTION

Figure 1:
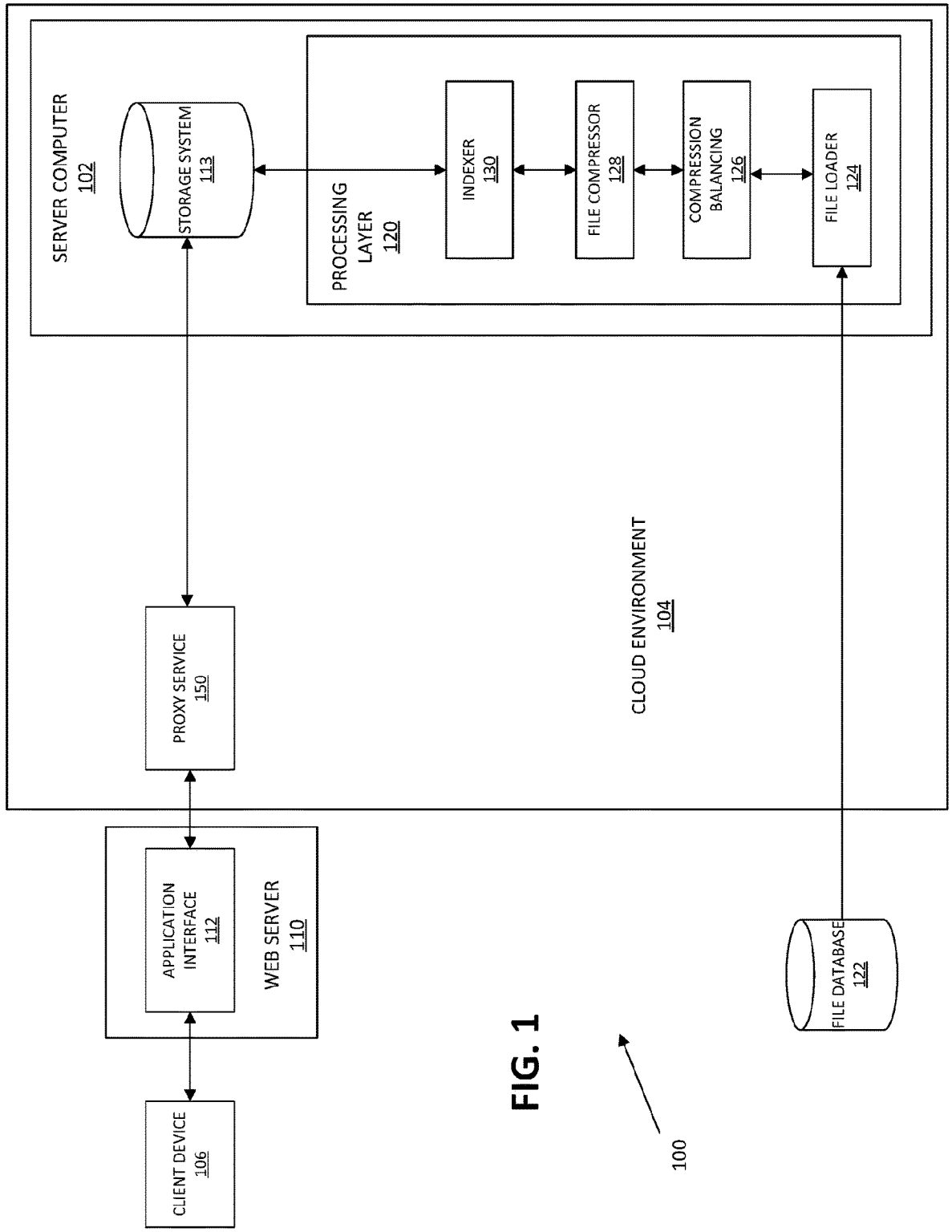
FIG. 1 illustrates a system level block diagram for a non-limiting example of a distributed computing environment that may be used in practicing the invention.

The present invention will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Typical large-scale data storage systems are designed to enable rapid access and retrieval of stored data. Although this enables improved performance in many different applications, some applications may not require such rapid access and retrieval of data. In those cases, large-scale data storage systems may be utilized that do not provide as rapid access and retrieval, potentially providing cost-savings over conventional systems.

For example, in the medical industry, many data files, such as images, video, data sets, and the like, may be stored in conjunction with a patient's permanent record. These files, once stored, are not generally accessed frequently or with a need for rapid (i.e., low latency) access. Typically, they are accessed only in advance of patient procedures, visits, evaluations, and the like. And, at those times, the files do not need to be accessed quickly and rapidly.

The present disclosure describes a data storage implementation that may be utilized in applications in which some degree of delay over conventional storage systems is permissible (e.g., in the case of storage data files in a medical application). The present file storage system operates by compressing a large number of files into a single archive or collection or groups of archives or collections using an optimal compression technology. Upon creating an archive, the system also generates an index for each archive, where the index identifies each file contained within the archive and may, optionally, include additional information describing where in the archive each file is located. In an embodiment, for example, the archive may include start and end positions of the bytes making up each file within the compressed archive.

With an archive created, to retrieve a file from an archive, the system receives a name of the file and an identification of the compressed file that the image is stored within. The compressed file is then loaded into memory by decompression, and the system extracts the identified file according from the decompressed archive. If the archive's index includes location information (e.g., start and end bytes) for the file being retrieved, that location information may be utilized to directly retrieve the file from the archive.

Because the archives are compressed, they require less storage space that uncompressed solutions, enabling the system to be implemented in a smaller footprint, thereby minimizing data storage costs. Although it does require time to retrieve an archive and decompress all or a portion of the archive to retrieve a desired file therefrom, the archive size can be adjusted to achieve a desired file-access retrieval time. For example, in one embodiment, where a file-access retrieval time of less than 6 second is desired, a target archive size of no larger than 250 megabytes may be utilized. Larger archive file sizes may be used, which may result in more efficient storage, with a corresponding increase in file-access time.

FIG. 1 illustrates a non-limiting example distributed computing environment 100, which includes one or more computer server computing devices 102, one or more user or client computing devices 106, and other components that may implement certain embodiments and features described herein. The server 102, client device 106, or any other devices may be configured to implement a client-server model or any other distributed computing architecture.

Server 102, client 106, and any other disclosed devices may be communicatively coupled via one or more communication networks. Such communication network may be any type of network known in the art supporting data communications. As non-limiting examples, the network may be a local area network (LAN; e.g., Ethernet, etc.), a wide-area network (e.g., the Internet), an infrared or wireless network, a public switched telephone networks (PSTNs), a virtual network, etc. The network may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

The embodiment shown in FIG. 1 is one example of a distributed computing system and is not intended to be limiting. The subsystems and components within the server 102 and client devices 106 may be implemented in hardware, firmware, software, or combinations thereof. Various different subsystems and/or components may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based environment 104, to support content distribution and interaction with client devices 106.

Cloud-based computing generally refers to a network-accessible platform implemented as a computing infrastructure of processors, storage, software, data access, and so forth that is maintained and accessible via a network such as the Internet. Cloud services do not require end-user knowledge of the physical location and configuration of the system that delivers the services. Common expressions associated with cloud services include "on-demand computing", "software as a service (SaaS)", "platform computing", "network accessible platform", and so forth. In an embodiment, cloud environment 104 is implemented as a software-as-a-service (SaaS), Hadoop environment in which data processing and storage may be distributed across a number of discrete computing elements.

Users operating client devices 106 may in turn utilize one or more client applications (e.g., virtual client applications) to interact with server 102 to utilize the services provided by these components. Client devices 106 may be configured to receive and execute client applications over one or more networks. Such client applications may be web browser based applications and/or standalone software applications, such as mobile device applications. Client devices 106 may receive client applications from server 102 or from other application providers (e.g., public or private application stores).

Client devices 106 may include an I/O subsystem for one or more user interface input devices and/or user interface output devices, possibly integrated with client devices 106, or may be separate peripheral devices which are attachable/detachable from client device 106. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from client devices 106 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Environment 100 includes a web server computer 110 configured to implement one or more web applications providing an application interface 112. Client device 106 is configured to communicate through the network with web server 110 using conventional network-based communication protocols. If application interface 112 is a web page, for example, client device 106 may retrieve the web page of application interface 112 from web server 110 and display the contents of the web page to a user using a suitable application, such as a web browser. The user can then interact with content of the web page (e.g., by executing one or more user control interfaces displayed within the web page). The interactions (e.g., selecting a button, entering text, or the like) are transmitted through the network to application interface 112, with web server 110 taking appropriate action in response to those actions. As detailed herein, web server 110 may, responsive to user input provided through application interface 112, interact with server computer 102 of cloud environment 104 to retrieve data and/or files therefrom.

In an embodiment, application interface 112 of web server 110 may implement a software application enabling a user of client device 106 to search for records relating to an individual, such as a patient. Example records may include patient images (e.g., x-ray images, CAT scan models, and the like), data files (e.g., test results, DNA analysis, and the like), video files (e.g., a video recording of a patient walking, an animation of a 3D model of the patient's heart, and the like) or any other data or files relating to the patient. Application interface 112 may provide a search user interface enabling the user of client device 106 to provide information describing the data or records that the user wishes to retrieve. Upon receipt of such search criteria, the web server 110 may interact with cloud environment 104 as discussed herein to retrieve the requested data files. Once identified, the data files can be transmitted from cloud environment 103 (and, specifically, server computer 102) to web server 110, with web server 110 passing the data files through the network to client device 106. Or, alternatively, cloud environment 104 (and, specifically, server computer 102) may transmit the requested data files directly to client device 105 through the network.

In some embodiments, the application interface 112 may be executed locally on the client device 106, such as by an application installed on and running on client device 106.

Various security and integration components may be used to manage communications over the network of environment 100. Such security and integration components may implement various security features for data transmission and storage, such as authenticating users or restricting access to unknown or unauthorized users. As non-limiting examples, these security components may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure, such as cloud environment 104.

In various implementations, the security and integration components may transmit data between the various devices in the environment 100. The security and integration components also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components may implement one or more web services (e.g., cross-domain and/or cross-platform web services) within environment 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components may include specialized hardware, network appliances, and the like (e.g., hardware-accelerated SSL and HTTPS), possibly installed and configured between server computer 102 and other network components, such as web server 110 and client device 106, for providing secure web services, thereby allowing any external devices to communicate directly with the specialized hardware, network appliances, etc.

Environment 100 also may include one or more data stores 113 accessible to server computer 102 and operating in one or more data centers in one or more physical locations, and communicating with one or more other devices within one or more networks. In some cases, one or more data stores 113 may reside on a non-transitory storage medium within the server computer 102. In certain embodiments, data stores 113 may reside in a storage-area network (SAN). Access to the data stores 113 may be limited or denied based on the processes, user credentials, and/or devices attempting to interact with the data store.

Cloud environment 104 (and, in turn, server computer 102) may include one or more processing units implemented as one or more integrated circuits (e.g., a conventional micro-processor or microcontroller), to control the operation of server computer 102. These processors may include single core and/or multicore (e.g., quad core, hexa-core, octo-core, ten-core, etc.) processors and processor caches. The processors may execute a variety of resident software processes embodied in program code, and may maintain multiple concurrently executing programs or processes.

Server computer 102 may comprise one or more storage subsystems, comprising hardware and software components used for storing data and program instructions, such as a system memory and a computer-readable storage media.

Such system memory and/or computer-readable storage media may store program instructions that are loadable and executable on the processor(s) of server computer 102. For example, the system memory may load and execute an operating system, program data, server applications, client applications, Internet browsers, mid-tier applications, etc.

The system memory may further store data generated during execution of these instructions. Such system memory may be stored in volatile memory. The system memory may also be stored in non-volatile storage drives (e.g., read-only memory (ROM), flash memory, etc.).

The storage subsystem of server computer 102 also may include one or more tangible computer-readable storage media for storing basic programming and data constructs that provide the functionality of some embodiments. For example, the storage subsystem may include software, programs, code modules, instructions, etc., that may be executed by a processor, in order to provide the functionality described herein. Data generated from the executed software, programs, code, modules, or instructions may be stored within a data storage repository within the storage subsystem.

Computer-readable storage media may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by server computer 102.

Due to the ever-changing nature of computers and networks, the description of cloud environment 104 and server computer 102 depicted in FIG. 1 is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

In an embodiment, the computing environment 100 depicted in FIG. 1 is utilized to efficiently store files, such as images, video, audio files, and the like in a manner that enables the files to be retrieved at a later date. As described herein, environment 100 operates by compressing a large number of files into a single archive or collection or groups of archives or collections using an optimal compression technology. Upon creating an archive, the system also generates an index for each archive, where the index identifies each file contained within the archive and may, optionally, include additional information describing where in the archive each file is located. In an embodiment, for example, the archive may include start and end positions of the bytes making up each file in the compressed archive.

Figure 2:
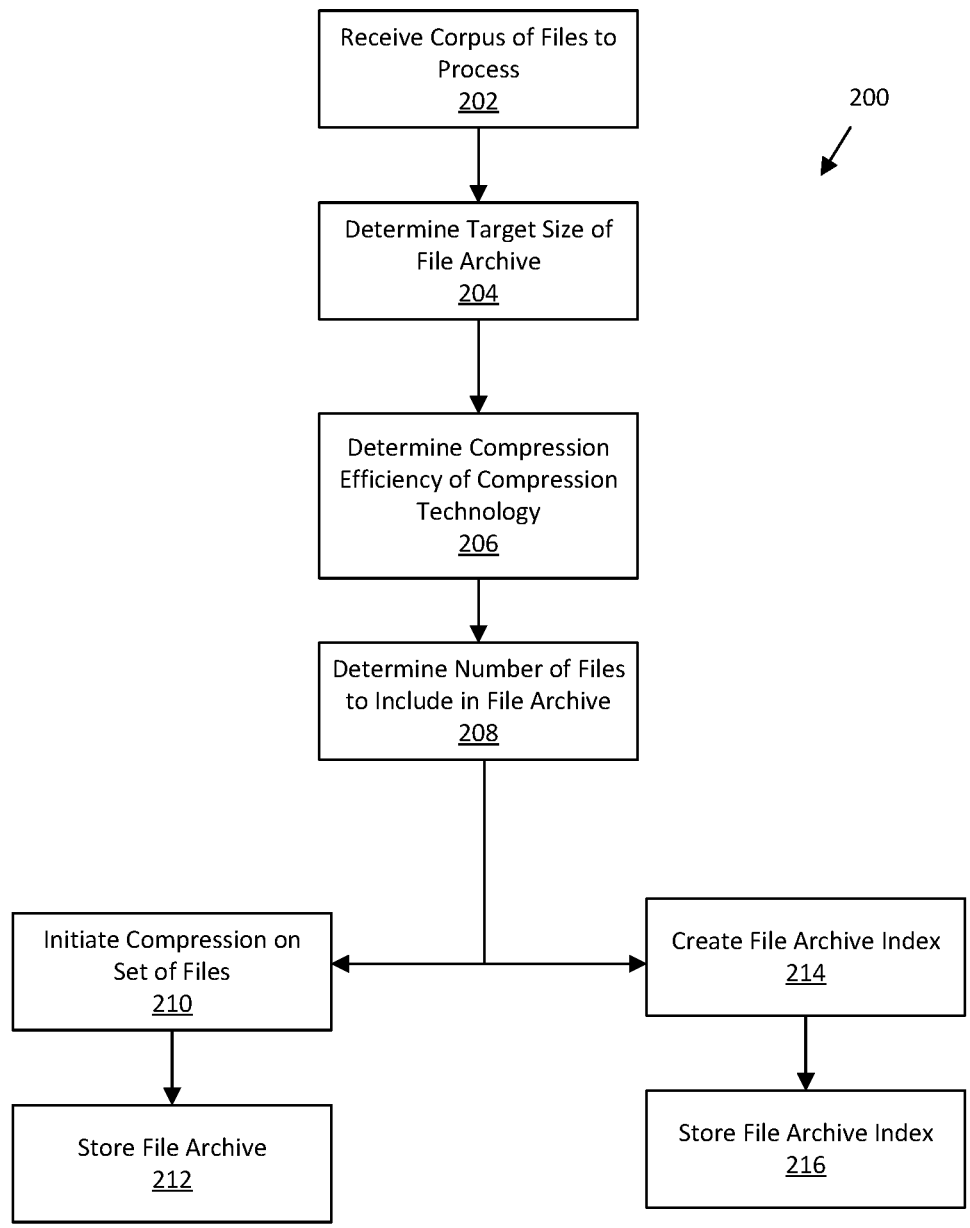
FIG. 2 is a flowchart illustrating a method for encoding a plurality of files into file archives, where each file archive has a target file size.

FIG. 2 is a flowchart depicting method 200 of creating a plurality of file archives in accordance with the present disclosure. As described, the method of FIG. 2 may be implemented by various components of the computing environment 100 of FIG. 1. In an embodiment, for example, method 200 is implemented (or primarily implemented) by a processing layer 120 of server computer 102.

In step 202 of method 200 a corpus of files (e.g., image files) is received for processing. The files to be processed may be retrieved, for example, from file database 122. In an embodiment, the corpus of files may be generated at a particular point in time (such as when incorporating all files or images from a legacy or pre-existing storage system). In other embodiments, however, multiple corpuses may be generated over time and the files stored therein may be processed at different times, such as when importing files from a system or repository that periodically outputs or generates files to be processed.

File database 122 typically includes a storage mechanism or archive that is remote to server computer 102. For example, file database 122 may be a data repository typically accessed by a third party software application to retrieve and process the stored files. In that case, server computer 102 may be given access (e.g., temporary access) to file database 122 to retrieve the files to be processed therefrom.

The corpus of files to be processed may be identified and loaded into server computer 102 by a file loader 124 module. File loader 124 is configured to access file database 122, possibly using a temporary authentication token, to retrieve files therefrom and transfer those files to server computer 102 for processing. In an embodiment, file loader 124 is provided with a list of files to be processed as well as identifications of the locations of the files to be processed within file database 122.

With the corpus of files to be processed retrieved from file database 122 by file loader 124, processing layer 120 in step 204 determines a target file archive size to be associated with the files being processed. Typically, the target file archive size is selected to enable processing of the file archives, as described below, within a reasonable amount of time given the application. If the files to be processed include images and other multimedia associated with patient records, for example, the target file archive size may be approximately 250 megabytes (MB), enabling retrieval of files from the archive in a time period ranging from about 1 second to about 6 seconds. In other applications, in which different file retrieval times may be acceptable or even preferred, different target file archive sizes may be selected.

Having determined the target file archive size to be utilized, in steps 206 and 208 the compression balancing module 126 of processing layer 120 determines a target number of files to be encoded into a number of file archives. For example, in step 206, compression balancing module 126 determines the current compression technology that will be used to create the plurality of file archives from the corpus of files to be processed. In an embodiment, the compression technology (e.g., zip or unzip applications executed in a UNIX computing environment) is determined by an operator of the system, for example. But in other embodiments, the compression technology to be used may be determined by various factors including the types of files to be processed, the target size of the file archives, and the like.

Having identified the compression technology to be used to generate the file archives, compression balancing module 126 determines the compression ratio for the identified compression technology. The compression ratio for a particular compression technology is expressed as the ratio of the size of an uncompressed file over the size of the same file compressed using the compression technology. As such, the compression ratio describes the effectiveness of a particular compression technology in terms of that technology's capacity for reducing file size. The greater the compression ratio, the greater the capacity for compression of a particular compression technology. To identify the compression ratio for the selected technology, compression balancing module 126 may access a look-up table, such as Table 1, below, that identifies, for each potential compression technology, that compression technology's compression ratio.

TABLE 1

| Compression Technology | Compression Ratio |
| --- | --- |
| Compression Technology #1 | 1.2 |
| Compression Technology #2 | 1.25 |
| Compression Technology #3 | 2.1 |
| Compression Technology #4 | 1.7 |
| Compression Technology #5 | 1.3 |

In step 208, having determined the compression technology to be utilized to generate the file archives as well as that technology's compression ratio, compression balancing module 126 determines the number of files from the files to be processed that will be incorporated into each file archive in order to achieve the target file archive size.

Typically, step 208 requires that compression balancing module 126 to determine the average file size of the files to be processed. Then, using the compression ratio, compression balancing module 126 can estimate the number of files that should be compressed into each file archive to achieve the target file archive size. Specifically, the number of files to be included in each file archive can be expressed according to equation (1), below:

$$\text{Number\_of\_files} = \text{target\_file\_archive\_size} / (\text{average\_file\_size}/\text{compression\_ratio}) \quad \text{equation (1)}$$

Having determined the number of files to be included in each file archive in step 208, processing layer 120 processes the corpus of files to be processed (retrieved by file loader 124 in step 202) into archive files.

Accordingly, in step 210, file compressor 128 retrieves a first set of files from the corpus of files to be processed. The first set of files includes a number of files equal to the number calculated in step 208 according to equation (1), above. With the first set of files retrieved, file compressor 128 executes the compression technology identified in step 206 to compress the first set of files into a single file archive that includes compressed versions of each file in the first set of files.

File compressor 128 iterates through the corpus of files to be processed by sequentially selecting sets or groups of files that include numbers of files equal to the number calculated in step 208 and then compressing those sets or groups of files into different archive files. File compressor 128 continues creating archive files in this manner until all files in the corpus of files to be processed have been compressed and stored in a particular archive file. Typically, each archive file will include the same number of files (i.e., the number calculated in step 208) other than the last archive file to be created. If the original corpus of files did not includes a number of files equal to a whole number multiple of the number calculated in step 208, the last archive file created by file compressor 128 may include fewer files than the number calculated in step 208.

Once created, each archive file is stored in a location accessible to server computer 102 in step 212. For example, the file archive files may be stored in storage system 113 of server computer 102. The archive may be single compressed files containing the contents of a plurality of different archive files or may be repositories (e.g., folders or directories) containing the archive files where each archive file is individually compressed and stored within the archive.

Figure 3:
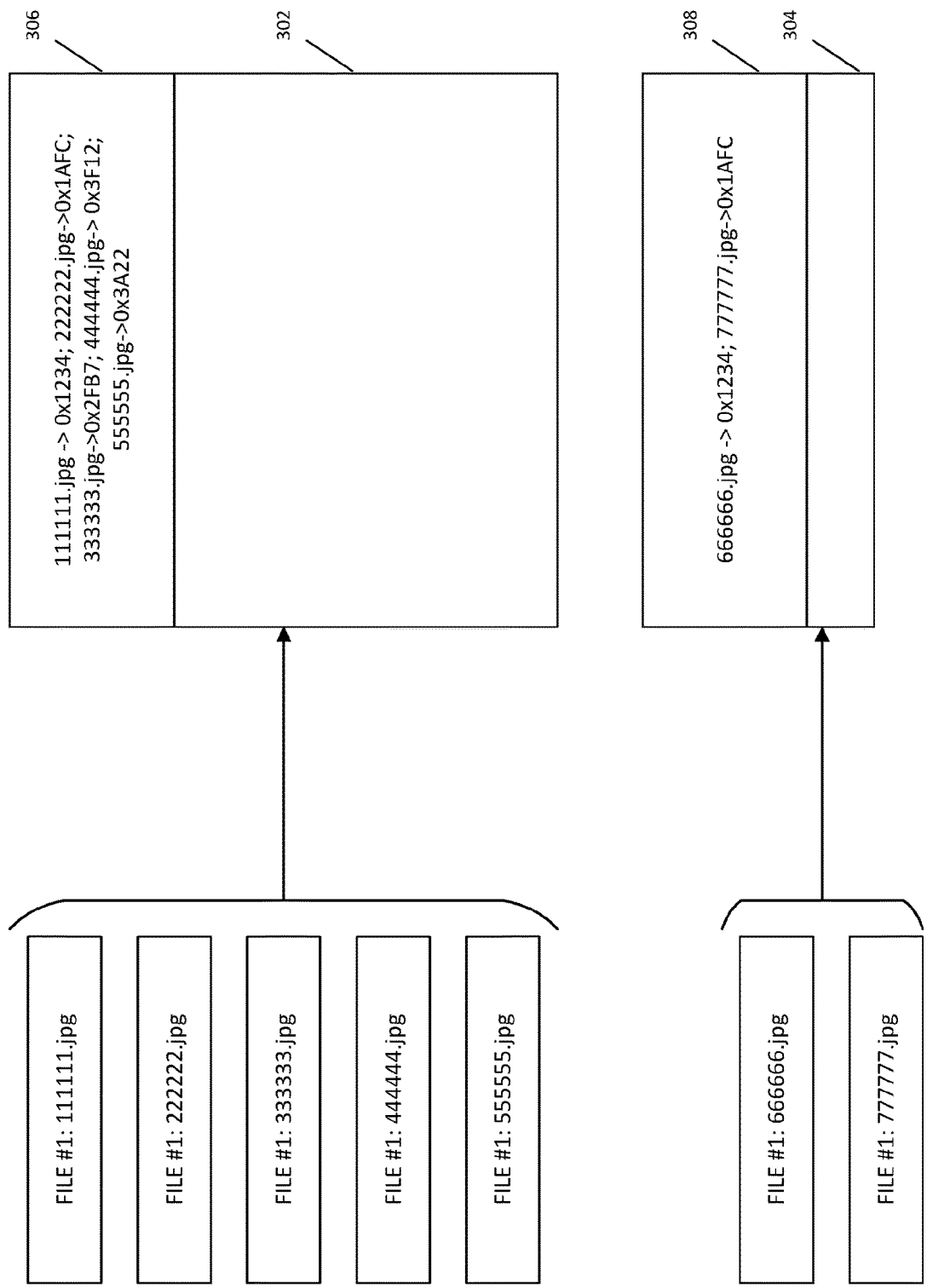
FIG. 3 is a diagram illustrating a number of file archives, where each file archive includes a plurality of files and an archive index describing a contents of the file archive.

FIG. 3 is a diagram illustrating a number of file archives, where each file archive includes a plurality of files and an archive index describing a contents of the file archive. In this example, the corpus of files to be processed includes 7 files (e.g., files 1111111.jpg through 7777777.jpg), and the target number of files to include in each archive is equal to 5. Accordingly, with reference to FIG. 3, a first set of 5 files is compressed by file compressor 128 into a first archive file 302. Because the original corpus of files to be processed only included 7 files (in this example), the remaining 2 files are processed by file compressor 128 into a second file archive 314. Of course, this is a simplified example. In typical embodiments, the corpus of files to be processed into file archives may include a much larger number of files (e.g., 1000s of files). FIG. 3 is just an example depicting the incorporation of a number of files from an original corpus of files to be processed into a number of file archives.

Figure 5:
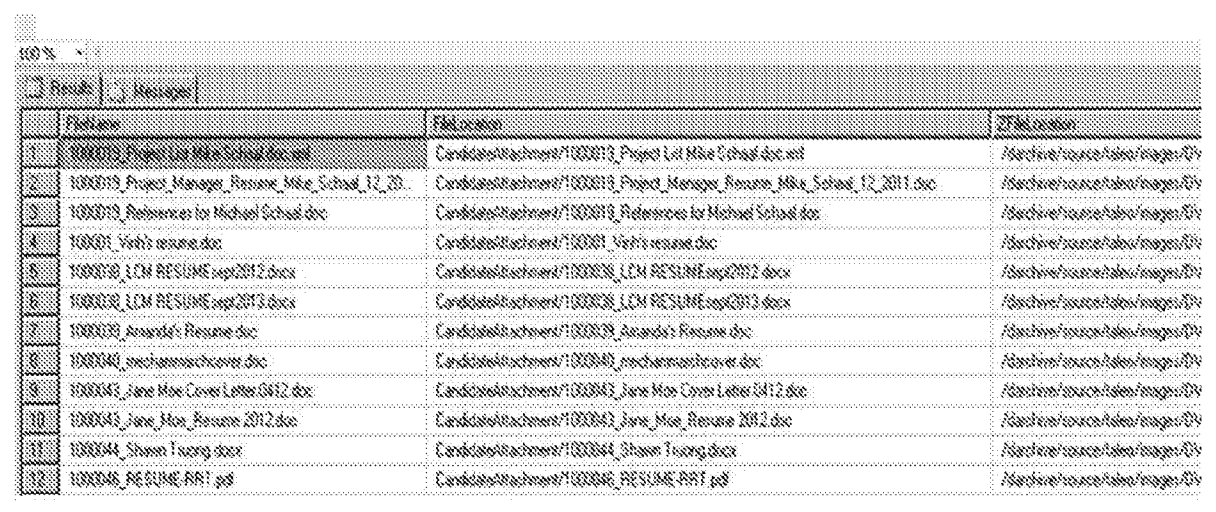

While file compressor 128 processes the corpus of files to create file archives according to steps 210 and 212, indexer 130 creates index files that include a record identifying which files from the corpus of files to be processed were compressed into which archive files. Typically, the archive index includes a mapping that includes the file names (e.g., a file identifier) of each file incorporated into an archive as well as an identification of the file archive into which the file was incorporated. Typically, the file archive is identified by name or another suitable file archive identifier. Accordingly, a file archive index identifies which file archive a particular file from the corpus of files was incorporated into. In some embodiments, the file archive may include additional information, such as the location (e.g., via start position byte and end position byte) of each file within each file archive, which may assist in later retrieval of a requested file from the file archive. FIG. 5 depicts the contents of a sample archive index in which the first column identifies file names, the second column identifies corresponding filenames for files stored in an archive and the third column identifies the storage location of files within the archive.

As they are created, the file archive indexes are stored in a location accessible to server computer 102 in step 212. For example, the file archive indexes may be stored in storage system 113 of server computer 102. Additionally, a copy of the file archive indexes are stored in a location accessible to application interface 112.

In some embodiments, the file archive indexes may be stored in combination with the file archives themselves. For example, with reference to FIG. 3, the file archive index 306 for file archive 302 is stored in combination with file archive 302 and, similarly, the file archive index 308 for file archive 304 is stored in combination with file archive 304. Each of file archive indexes 306 and 308 includes a listing of the files that were included in the respective file archive. Additionally, in the example, for each file, file archive indexes 306 and 308 includes the start byte positions of each file within the respective archive. In an embodiment, the file archives are also stored by an application server (e.g., web server 110 of FIG. 1). As such, upon receipt of a request for a particular file, the application server can use the file archive indexes to identify the file archive storing the requested file.

With the file archives and file archive indexes created and stored in a location accessible to server computer 102, a user of client device 106 can access web server 110 to retrieve requested files from the stored file archives.

Figure 4:
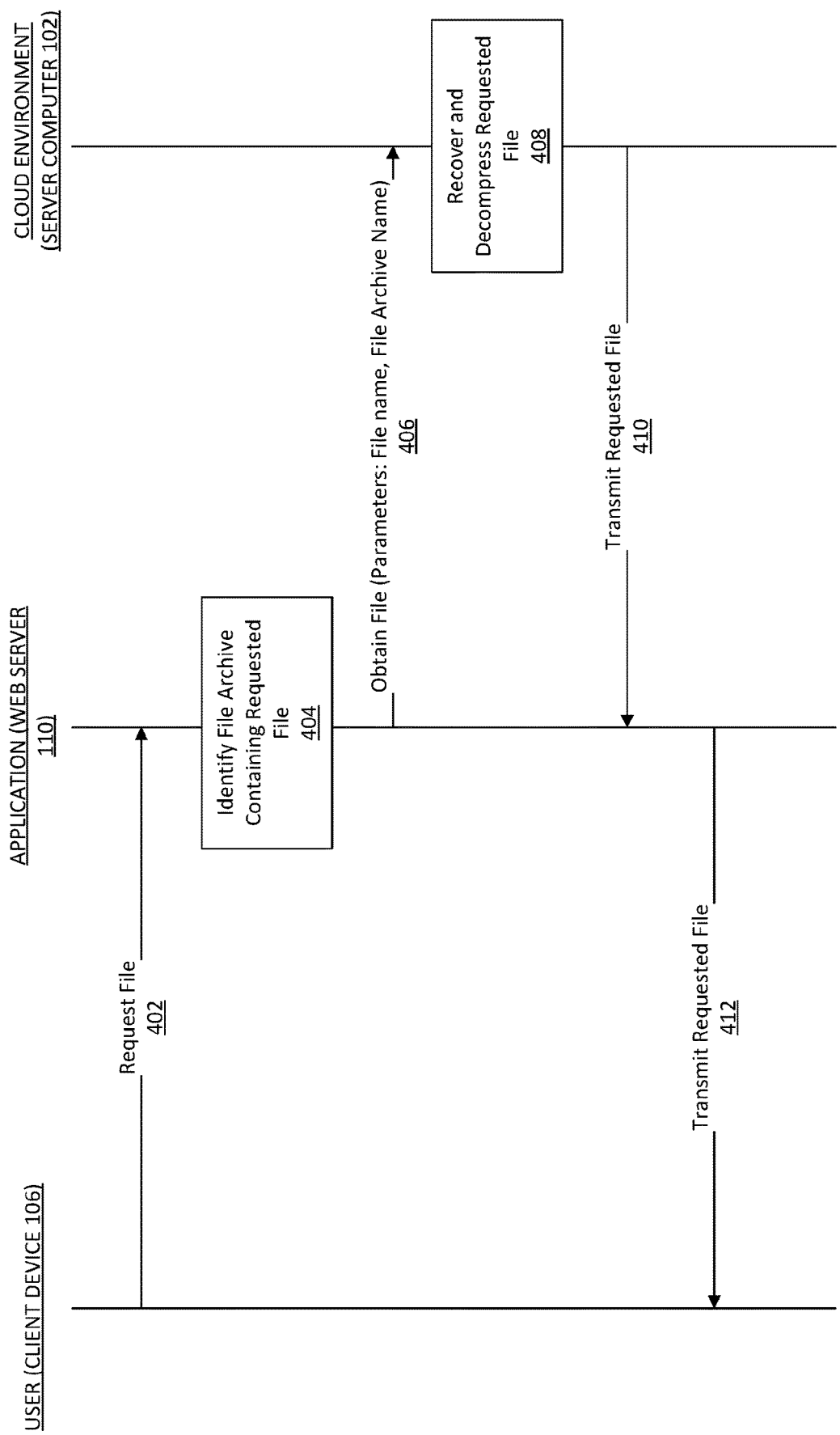
FIG. 4 is a messaging flowchart illustrating a message flow for a client device to request a file from a cloud computing environment, where the file is stored in a compressed file archive.

For example, FIG. 4 is a flowchart illustrating a message flow for client device 106 to request a file from cloud computing environment 104, where the file is stored in a compressed file archive.

In a first step 402, client device 106 transmits a request for a particular file to an application. For example, if web server 110 executes a web-based application enabling client device 106 to search for files stored in a file repository and request copies of those files, step 402 may involve client device 106 transmitting a request for a particular file to application interface 112 provided by that web-based application. In a specific example, where the web-based application allows a user to search through patient records and request copies of files associated with those patient records, client device 106 may access the application interface 112 to access a particular patient record that is associated with a number of patient data files. Then, in step 402 a user of the client device can select one or more of the patient data files to be retrieved. The file request transmitted in step 402 includes the name of the file to be retrieved.

In step 404, upon receipt of the file request, web server 110 accesses the file archive indexes to identify the file archive containing the requested file. This may involve the web server 110 searching the file archive indexes to locate the file name received in the file request of step 402 and to identify the file archive associated with the requested file name.

Having identified the file archive containing the request file, in step 406, the web server 110 transmits an "obtain file" request to the cloud environment 104. Specifically, the web server 110 transmits the obtain file request to a proxy service 150 implemented by cloud environment 104 which, in turn, passes the obtain file request to server computer 102. The obtain file request transmitted in step 406 includes parameters including the name of the file that was originally requested in step 402, in addition to the name of the file archive identified in step 404.

Typically, step 406 is executed by the web server 110 accessing a particular URL at proxy service 150. In that case, the original file name and the file archive name may be encoded as parameters to the URL request transmitted by web server 110 to proxy service 150. To illustrate, the following example URL identifies the file "CandidateAttachment/xxxxx_Cindy Jones MSJ Checklist (2).docx" being stored in the archive "DWH_CandidateAttachments": 'https://.xxxxxxxx.xxx.com/himage/getImage?path=/xarchive/source/talxx/images/DWH_CandidateAttachments_001_0003.zip&app=talxx&file=CandidateAttachment/xxxxx_Cindy%20 Jones%20MSJ%20Checklist%20(2).docx'

Upon receipt of the obtain file request, server computer 102 in step 408 retrieves the file archive identified in the request from storage system 113. Server computer 102 then decompress the retrieved file archive into a working memory (e.g., RAM) of server computer 102. With the file archive decompressed, server computer 102 identifies within the decompressed archive a decompressed file having the name of the requested file. Once the file is identified, in step 410 server computer 102 transmits a copy of the requested file to the web server 110 and in step 412 the web server, in turn, transmits a copy of the requested file back to client device 106. When transmitting the file, server computer 102 may bit-stream the image to either client device 106 or web server 110 and, in so doing, the file that is being transferred is not stored in a permanent memory of server computer 102 or cloud environment 104 and is instead only stored in a working (e.g., volatile RAM) memory of cloud environment 104. Client device 106 can then display the contents of the requested file to the user of client device 106.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system, comprising:
   an application server, including a database identifying, for each file identifier in a plurality of file identifiers, an associated file archive identifier, the application server being configured to:
      receive, from a user device, a request for a file, the request for a file including a first file identifier,
      access the database to identify a first file archive identifier associated with the first file identifier in the data, and
      transmit a file retrieval instruction including the first file identifier and the first file archive identifier; and
   a cloud computing environment, including:
      a memory storing a plurality of file archives, each file archive in the plurality of file archives being associated with a file archive identifier, wherein each file archive includes a plurality of compressed files compressed as a set, and
      a processor, configured to:
         receive, from the application server, the file retrieval instruction,
         retrieve from the memory, based on the first file archive identifier, a first file archive comprising compressed versions of a plurality of files;
         decompress a portion of the first file archive in the plurality of file archives to retrieve a first file from the first file archive, and
         transmit the first file to at least one of the application server and the user device.

2. The system of claim 1, wherein the application server is executed locally on the user device.

3. The system of claim 1, wherein the first file identifier includes an address within the first file archive.

4. The system of claim 1, wherein the application server is executed by a server computer that is remote to the user device.

5. The system of claim 1, wherein the application server is configured to access a uniform resource locator on the cloud computing environment, wherein the uniform resource locator includes the file retrieval instruction.

6. The system of claim 1, wherein the cloud computing environment is configured to decompress the portion of a first file archive by decompressing an entirety of the first file archive.

7. The system of claim 1, wherein the portion of the first file archive is determined by the first file identifier.

8. The system of claim 1, wherein the cloud computing environment is configured to:
   retrieve a plurality of files from a remote data source,
   identify a first set of files in the plurality of files, and
   compress the first set of files into the first file archive using a compression algorithm.

9. The system of claim 8, wherein the cloud computing environment is configured to identify the first set of files in the plurality of files by:
   determining a compression ratio of the compression algorithm, wherein the compression ratio is expressed as uncompressed size over compressed size;
   determining a target size of the first file archive; and
   identifying the first set of files having a total file size equal to the target size of the first file archive multiplied by the compression ratio.

10. A method, comprising:
    receiving, by an application server coupled to a computer network and comprising a first processor executing a first set of instructions within a first memory, from a user device coupled to the computer network, a request for a file, the request including a file identifier;
    identifying, by the application server within a database coupled to the computer network, a file archive identifier associated in the database with the file identifier using an index that identifies files contained in a file archive associated with the file archive identifier;
    transmitting, by the application server through the computer network to a cloud computing server comprising a second processor executing a second set of instructions within a second memory, a file retrieval instruction including the file archive identifier and the file identifier;
    receiving, by the application server from the cloud computing server, a file associated with the file identifier and decompressed, by the cloud computing server, from a file archive associated with the file archive identifier; and
    transmitting the file to the user device.

11. The method of claim 10, further comprising the step of transmitting, within the file retrieval instruction, a Uniform Resource Locator.

12. The method of claim 11, further comprising the step of including, within the Uniform Resource Locator:
    a first parameter comprising the file archive identifier; and
    a second parameter comprising the file identifier.

13. A system, comprising:
    a data source comprising a first memory storing an aggregation of files;
    a cloud computing environment, including a processor, configured to:
       retrieve a plurality of files from the data source;
       select a compression algorithm from among a plurality of compression algorithms;

determine, according to the compression algorithm, a target number of files to be included in a file archive for a target size of the file archive;
identify a first set of files of the target size in the plurality of files;
compress the first set of files into the file archive using the compression algorithm selected;
generate an index comprising an association of a file identifier for each of the plurality of files with a file archive identifier for the first file archive; and
store the file archive as a compressed file in a second memory in the cloud computing environment.

14. The system of claim 13, wherein the processor is further configured to select the compression algorithm from among the plurality of compression algorithms by determining a compression ratio of the compression algorithm.

15. The system of claim 14, wherein the compression ratio is expressed as uncompressed size over compressed size.

16. The system of claim 13, further comprising a user device coupled to a computer network and configured to:
receive a request for a file in the file archive; and
transmit the request to a proxy service running on at least one server coupled to the computer network.

17. The system of claim 16, further comprising the proxy service configured to:
identify, within the index, the file identifier for the file and the file archive identifier for the file archive; and
transmit a file retrieval instruction to the cloud computing environment, the file retrieval instruction including the file identifier and the file archive identifier.

18. The system of claim 17, further comprising the proxy service configured to:
receive the file from the second memory; and
transmit the file to the user device.

19. The system of claim 13, wherein the data source is remote to the cloud computing environment.

20. The method of claim 10, wherein the index comprises a location of each file contained in the file archive, the location comprising a start position and an end position of bytes making up each file.

\* \* \* \* \*